United States Patent [19]
Pfaltzgraff

[11] Patent Number: 4,864,896
[45] Date of Patent: Sep. 12, 1989

[54] METHOD AND APPARATUS FOR TIPPING TEETH OF SAW BLADES

[75] Inventor: James R. Pfaltzgraff, Beaverton, Oreg.

[73] Assignee: Armstrong Manufacturing Company, Portland, Oreg.

[21] Appl. No.: 67,645

[22] Filed: Jun. 26, 1987

[51] Int. Cl.⁴ ............................................. B23D 65/00
[52] U.S. Cl. ........................................ 76/25 R; 76/112
[58] Field of Search .................. 76/112, 101 R, 101 A, 76/25 R; 219/77, 152

[56] References Cited

U.S. PATENT DOCUMENTS

| | | |
|---|---|---|
| 1,733,241 | 10/1929 | Scott . |
| 1,901,654 | 3/1933 | Kerr . |
| 2,683,923 | 7/1954 | Replogle . |
| 2,833,638 | 5/1958 | Owen . |
| 2,880,768 | 4/1959 | Kolesh . |
| 3,034,378 | 5/1962 | Anderson . |
| 3,063,310 | 11/1962 | Connoy . |
| 3,104,562 | 9/1963 | Kolesh . |
| 3,241,228 | 3/1966 | Rayniak et al. . |
| 3,295,396 | 1/1967 | Kolb . |
| 3,718,799 | 2/1973 | Sawamura et al. . |
| 3,766,354 | 10/1973 | Bierwith . |
| 3,800,633 | 4/1974 | Funakubo . |
| 3,882,594 | 5/1975 | Jackson et al. . |
| 4,205,564 | 6/1980 | Kolb et al. . |
| 4,214,499 | 7/1980 | Ellis . |
| 4,306,139 | 12/1981 | Shinozaki et al. . |
| 4,366,728 | 1/1983 | Beck et al. . |
| 4,407,172 | 10/1983 | Beck et al. . |
| 4,462,293 | 7/1984 | Gunzner . |
| 4,564,136 | 1/1986 | Kähny et al. ........................ 228/6.1 |

OTHER PUBLICATIONS

Original Vollmer Brochure, "GAW 11 U, Automatic Machine for the Stellite Tipping of Tooth Tips of Band, Gang and Circular Saw Blades".
Alligator Brochure, "Depomatic Plasma PS, Automatic Stellite Tipping Machine".
HS International Brochure, "The ISELI Sawblade Tipping System".
Chaston Industrial Saw Ltd. Brochure, "ISELI Type SAA Automatic Saw Tipping Machine".
Original Vollmer Brochure, "GF 10 U, Machine for the Stellite Tipping of Band Saws, Gang Saws and Circular Saws".

*Primary Examiner*—Roscoe V. Parker
*Attorney, Agent, or Firm*—Klarquist, Sparkman, Campbell, Leigh & Whinston

[57] ABSTRACT

Wear-resistant tips, preferably comprising preformed pellets of stellite in square configuration, are welded, cooled and subsequently annealed to a saw tooth at a single machine station in rapid succession. A head assembly manipulates the individual pellets and positions them properly on the saw blade for forging thereto. The square configuration of the pellets permits their reliable manipulation and orientation by the automated equipment. The duration of the pellet welding phase is determined by the displacement of the pellet into the saw blade, rather than by reliance on a predetermined time period. After cooling, the annealing is accomplished by using the same electrical power supply as is employed for the welding. The duty cycle of this power supply, however, is regulated to produce the amount of annealing heat required for the particular steel being worked. After the welding, cooling and annealing operations are performed on one tip on one saw tooth, the saw is indexed to bring the next tooth into position for processing.

23 Claims, 4 Drawing Sheets

METHOD AND APPARATUS FOR TIPPING TEETH OF SAW BLADES

TECHNICAL FIELD

The present invention relates generally to cutting tools, and relates more particularly to the tipping of circular saws, band saws and the like with wear resistant materials, particularly cobalt alloys.

BACKGROUND AND SUMMARY OF THE INVENTION

The advantages of a saw blade or band having extremely hard cutting teeth and a tough, fatigue-resistant backing body have been known and understood for many years. Quite early in the art a compound or laminated steel strip consisting of a narrow band of very hard steel welded to one edge of a wide band of softer steel was employed for this purpose, the teeth being in the hard steel band. U.S. Pat. No. 1,521,857 to Blum is an example of this technique.

Another approach to producing hard cutting teeth on a fatigue-resistant saw blade is through selective heat treatment and tempering of the blade, i.e. giving the teeth a heat treatment different from that of the rest of the blade. This technique forms the basis for U.S. Pat. Nos. 1,130,649 to Whitaker and 1,352,140 to Napier.

A third approach to saw construction consists in brazing or similarly fastening hard steel or carbide inserts or tips in or to the saw teeth. Examples of this technique are found in U.S. Pat. Nos. 2,318,549 to Wilkie and 2,880,768 to Kolesh.

The success of a saw blade made by this third technique, that is, having hard steel or carbide inserts fastened thereto, depends on the security of the fastening and the support given the cutting tips by the body of the teeth. The above-noted patent to Kolesh recognized this requirement and in an attempt to meet it swaged the leading face of the saw teeth to provide seats of increased area to support the hard metal or carbide tips which were brazed or similarly anchored thereto. This technique, however, was criticized in a subsequent U.S. Pat. No. 3,034,378 to Anderson because of the difficultly of handling the small carbide tips.

Anderson also criticized Kolesh because of the nature of the brazing technique used to secure the carbide tips to the steel. Brazing materials customarily used are non-ferrous, brass being the most common. These materials may become brittle, especially where the area of the bond is small in relation to the effective cutting edge of the tool, as is the case in a saw blade. Furthermore, the temperatures reached by a carbide tip during a cutting operation can sometimes exceed the melting point of the brazing material.

In U.S. Pat. No. 3,034,378, Anderson proposed a method for fusing a carbide tip to a steel saw blade by an electric-welding technique. The carbide of which the tip is formed is provided in a rod-like configuration, up to several feet in length, preferably having a rectangular cross section. During the welding operation, the portion of the tooth continguous to the rod becomes heated to its fusion temperature and hence softens, but the carbide rod retains its form. Pressure exerted on the rod then forces the rod into the adjacent portion of the tooth as the weld is formed. After the tip is welded, the junction is annealed to relieve stresses in the steel. After these operations are completed, a diamond cutting wheel severs the carbide fused into the tooth from the remainder of the carbide rod, readying the carbide rod for the next cyclical operation. The discrete carbide tips which Anderson found unwieldy in Kolesh were thus eliminated.

In U.S. Pat. No. 3,295,396 to Kolb, a resistance welding process and apparatus for welding a tip on a saw tooth is disclosed. In such technique, the tip material is again separated from a welding rod after the welding process. The saw is annealed after the welded tip has been shaped by grinding.

U.S. Pat. No. 4,205,564, also to Kolb, discloses use of discrete, rectangular tips carried on a foil tape to each tooth. A tip and its underlying foil tape are pressed against the tooth while the tooth is heated using a torch or resistance welding technique. Preferably, the foil tape carrier for each tip is made of a brazing material so that the resulting joinder of tip and tooth is by a combination of brazing and welding. There is no annealing step disclosed.

U.S. Pat. No. 3,800,633 to Funakubo discloses a method for forming tungsten-carbide tipped saw blades. The Funakubo saw is first preprocessed to cut a notch in each tooth for receiving the tip. A preformed tip is then inserted into the notch and brazed in place.

U.S. Pat. No. 4,462,293 to Gunzner discloses a method for tipping saw teeth with carbide-containing steel. Like the Funakubo method, the saw must first be ground to provide notches in the teeth into, which the carbide-containing tips are to be welded.

U.S. Pat. No. 2,683,923 to Replogle discloses a method for fusion welding tips to saw blades. The Replogle technique relies on three distinct zones of metal, a first zone being the cutting edge, the third zone being the base material and the intermediate zone being provided principally by a welding rod or wire and having a composition intermediate the composition of the first and third zones.

In recent years, Stellite has become a popular material for tipping saw blades. Stellite is a class of hard, wear and corrosion-resistant non-ferrous alloys composed principally of cobalt (20–65 percent), together with lesser amounts of chromium (11–32 percent) and tungsten (2–18 percent) that exhibits exceptionally high resistance to softening at high temperatures.

An example of an apparatus adapted to apply Stellite tips to saws is the ISELI tipping machine, distributed in the United States by H.S. International, Inc. and in Canada by Chaston Industrial Saw, Ltd. The ISELI machine employs Stellite in extruded rod form which is cut by the machine, into short lengths and then resistance welded to the tooth of a saw blade. After the tooth has been tipped with Stellite, it is advanced to an adjacent station at which the weld is annealed by an electric element. This process is repeated until all teeth have been processed at both the welding and annealing stations.

One of the problems of the ISELI machine is that approximately fifty percent of the Stellite material is wasted, being ground away during the grinding operation. Furthermore, the grinding operation is unduly time consuming due to the substantial amount of material that must be removed.

Vollmer Werke Maschinenfabrik GmbH of West Germany markets Stellite tipping machines under the designations GF10U and GWA11U. The GF10U is a manual machine that relies on a skilled operator to apply material from a Stellite welding rod to the tooth using a welding torch. Saw teeth tipped by the GF10U machine are desirably preprocessed by swaging or cutting to provide a larger surface area for Stellite application.

The GWA11U machine is similar to the GF10U, but employs automated handling of the Stellite welding rod and the welding torch. The welding torch is ignited in intervals, depending on the particular cycle selected, and the molten Stellite drops onto the blade. Annealing is accomplished by a welding torch placed subsequently to the welding point.

The GWA11U machines suffer by use of a welding torch for the delicate annealing operation. It is very difficult to control the annealing parameters when using a gas or plasma torch operating at 6000 degrees.

ETS Alligator of Paris, France, markets a tipping machine under the designation Depomatic Plasma PS that employs a plasma torch to weld Stellite rod to the tips of saw blades. One version of the machine uses the same plasma torch to anneal all of the tips after all of the welding operations are completed. The second version uses an induction heating coil.

The gas plasma and TIG welding techniques employed in these prior art machines are necessarily complex, requiring carefully tailored starting and extinguishing cycles in which the start voltage, start ramp, high voltage start, ramping parameters, gas mix, wire feeding rate, et cetera, must all be set.

From the foregoing it will be recognized that all of the prior art techniques suffer from a variety of drawbacks which make them poorly suited for the simple, reliable and economical application of tipping material, particularly Stellite, to saw blades and the like.

Accordingly, it is a principal object of the present invention to provide a method and apparatus for tipping saw blades that overcomes these drawbacks found in the prior art.

Another object of the present invention is to provide a method and apparatus for providing Stellite tips to a saw blade by techniques which are faster, more effective and more consistent than prior art techniques.

Yet another object of the present invention is to provide a method and apparatus for applying tips to saw blades, which tips are adapted for ease of manipulation and orientation by an automatic tipping machine.

Still another object of the present invention is to control the period during which welding heat is applied to a tip/blade junction by monitoring the displacement of the tip into the blade.

According to the present invention, wear-resistant tips, preferably comprising preformed pellets of Stellite in square configuration, are welded, cooled and subsequently annealed to a saw tooth at a single machine station in rapid succession. A head assembly manipulates the individual pellets and positions them properly on the saw blade for forging thereto. The square configuration of the pellets permits their reliable manipulation and orientation by the automated equipment. The duration of the pellet welding phase is determined by the displacement of the pellet into the saw blade, rather than by reliance on a predetermined time period. After cooling, the annealing is accomplished by using the same electrical power supply as is employed for the welding. The duty cycle of this power supply, however, is regulated to produce the amount of annealing heat required for the particular steel being worked. After the welding, cooling and annealing operations are performed on one saw tooth, the saw is indexed to bring the next tooth into position for processing.

The foregoing and other objects, features and advantages of the present invention will be more readily apparent from the following detailed description of a preferred embodiment thereof, which proceeds with reference to the accompanying drawings.

DETAILED DESCRIPTION OF PREFERRED EMBODIMENT

The present application hereby incorporates by reference the disclosure of my copending application Ser. No. 07/067,523 entitled Method and Apparatus for Grinding Saw Teeth, filed contemporaneously herewith.

Figure 1:
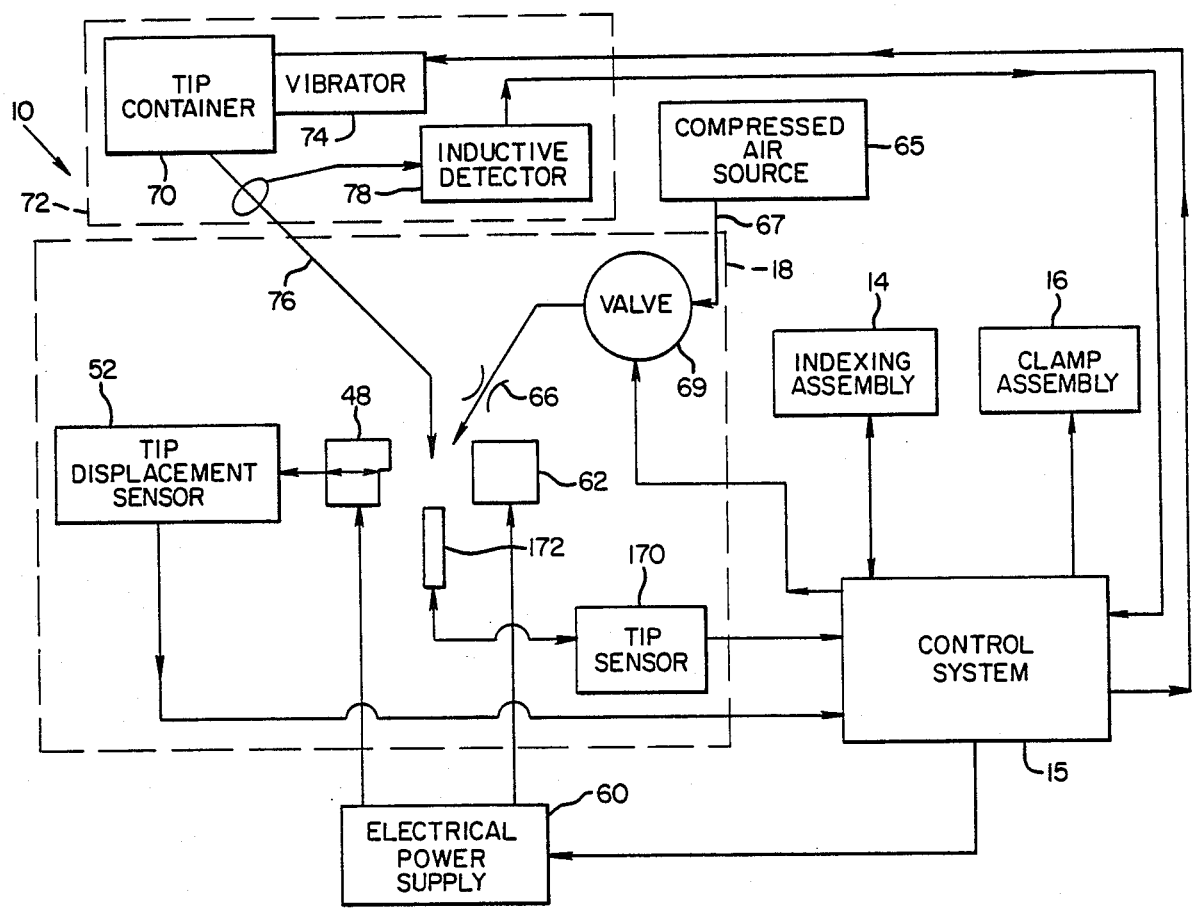
FIG. 1 is a simplified block diagram of a tipping machine according to the present invention.
Figure 2:
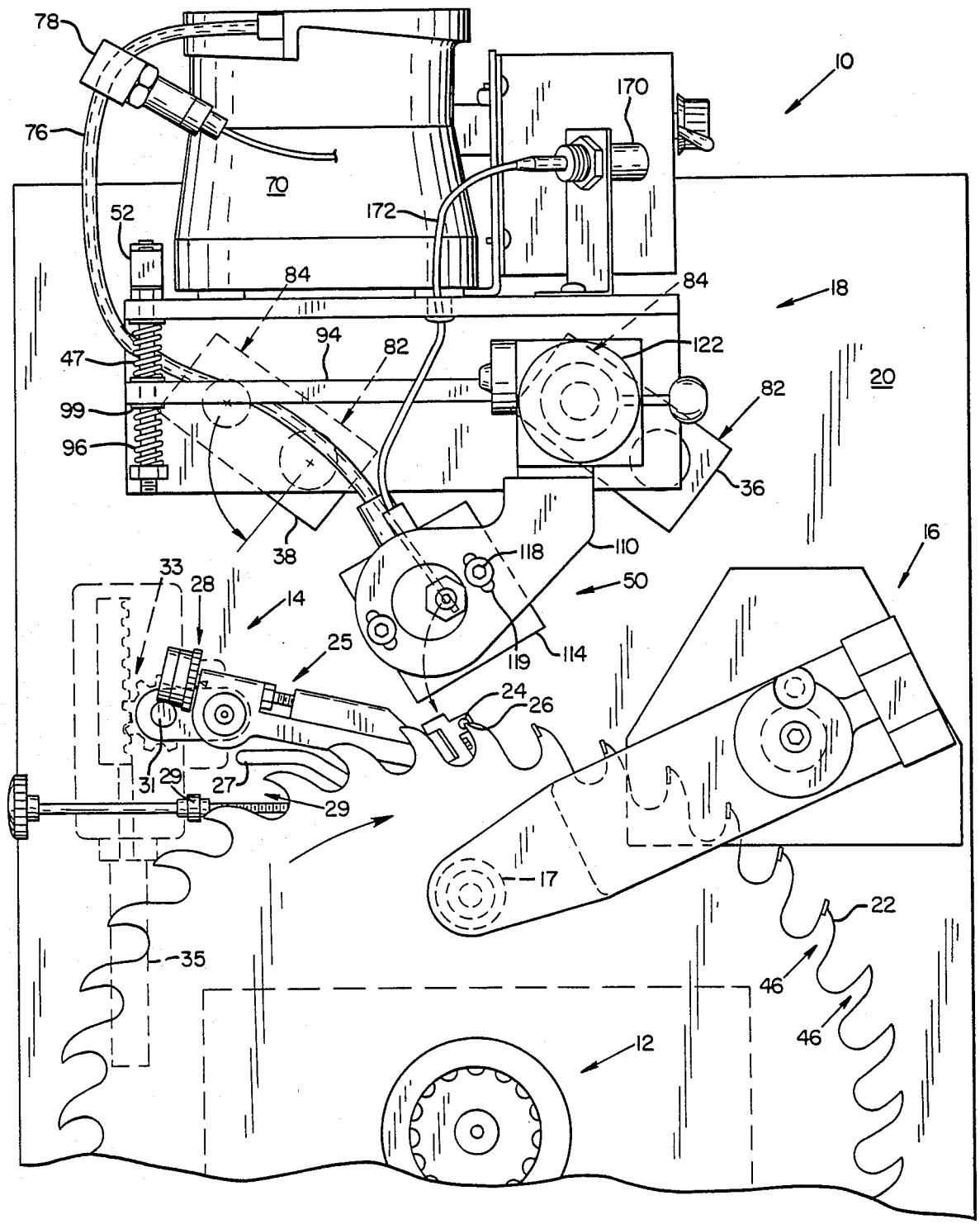
FIG. 2 is a front elevational view of a tipping machine according to the present invention showing a head assembly in its raised position.

With reference to FIGS. 1 and 2, a tipping apparatus 10 according to the present invention includes a saw mounting assembly 12, an indexing assembly 14, a clamp assembly 16 and a head assembly 18, all affixed to a case 20. Mounting assembly 12 mounts a saw blade 22 in a desired spatial relationship with head assembly 18. Indexing assembly 14 moves saw blade 22 on mounting assembly 12, under the control of a control system 15, to position successive teeth of the saw blade at a top dead center position beneath head assembly 18. Clamp assembly 16 is operable alternately with indexing system 14, again by control system 15, to prevent movement of saw blade 22 when it is being operated on by head assembly 18.

In the preferred embodiment, indexing assembly 14 includes an outwardly projecting feed finger 24 that pushes saw 22 by its teeth to position successive teeth below head assembly 18. Feed finger 24 is spring loaded so it can ride over the back of the adjacent tooth and is driven by a cam follower assembly 25 that slides in a track 27 in a base 29 affixed to case 20. Cam follower assembly 25 is driven by a rotary actuator 31 which is operated by a rack and pinion assembly 33, which is in turn driven by a pneumatic cylinder 35. These later components are all positioned within case 20.

Finger 24 includes a notched cutout 26, occupying the lower right quadrant of the finger as shown in FIG. 2, into which the tip of the top dead center tooth nests when saw 22 is raised to the proper spatial relationship relative to head assembly 18. The final position of feed finger 24 is also movable laterally by a dial assembly 28 to adjust top dead center of the apparatus a small distance to the right or left. As will be recognized later, this adjustment can be used to adjust the depth to which the tip pellets employed by the present invention are forged into the blade 22. Dial assembly 28 is calibrated in thousandths of an inch to facilitate this adjustment.

Clamp assembly 16 comprises a pair of complementary clamping jaws 17 between which blade 22 is secured during each welding operation. These jaws are operated by a pneumatic cylinder disposed within case 20. After each welding operation, the jaws are separated, permitting blade 22 to be advanced step-wise by indexing system 14 to bring subsequent teeth into position to have tip pellets welded thereto.

After saw 22 is positioned beneath head assembly 18 and is clamped in place, feed finger 24 retracts and the head assembly is lowered by two swing arms 36, 38, again under the control of control system 15, to engage a face 40 of a tip pellet 42 (FIG. 3) with the end portion of a front edge 44 of a saw tooth 46. The pressure applied by tooth 46 onto tip pellet 42 loads a first, or forging spring 47 (FIGS. 2, 4, 5) on head assembly 18 which provides a force of approximately 20-50 psi against the tip pellet that, after the tooth and tip pellet are heated, will force the tip pellet into the tooth, as described more fully in a later section. Until heat is applied, forging spring 47 serves merely to compress tip pellet 42 between a copper welding shoe 48 in a tipping station portion 50 of head assembly 18 and saw tooth 46.

Figure 3:
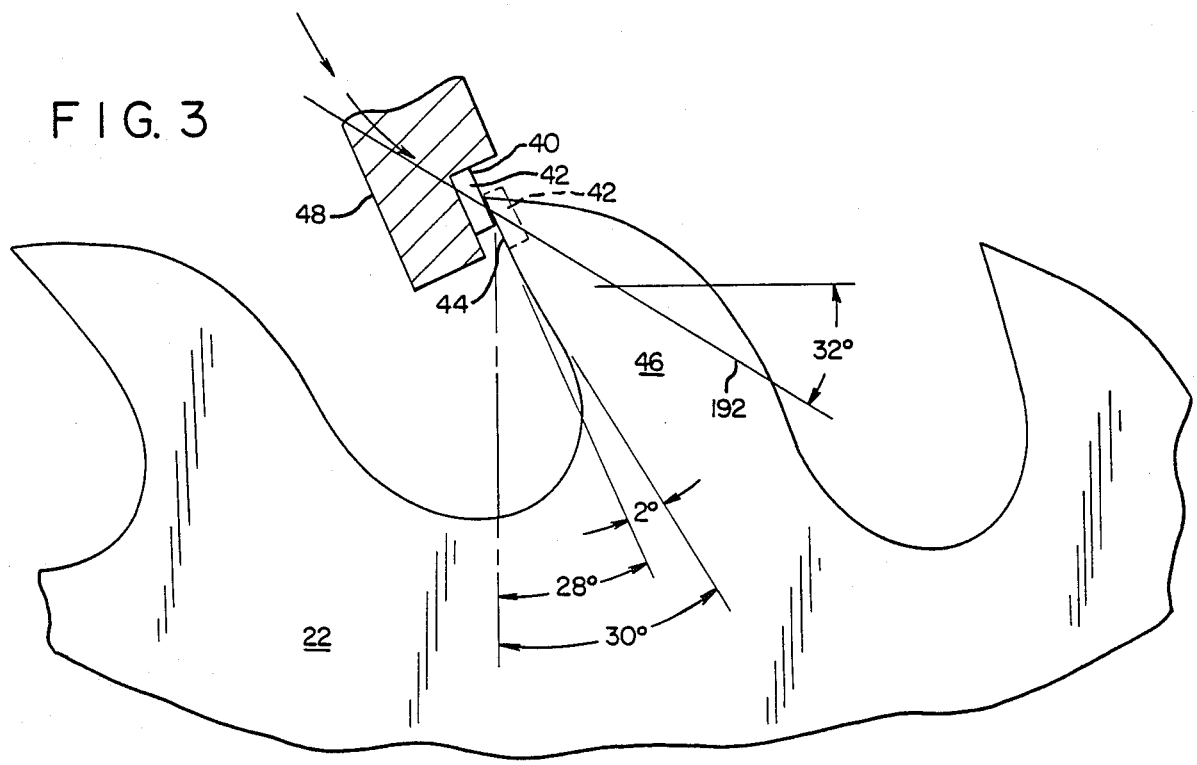
FIG. 3 is a diagram illustrating the geometry involved in the tipping technique employed by the present invention.

With tip pellet 42 in the position illustrated in solid lines in FIG. 3, a large welding current, typically 500 amperes, is next passed from a power supply 60 (FIG. 1) (controlled by control system 15) between tooth 46 and tip pellet 42. This welding current is coupled from power supply 60 to saw 22 through an electrode 62 in clamp assembly 16 and is coupled to tip pellet 42 through welding shoe 48 in tipping station 50. This current heats the adjoining portions of the tooth and tip pellet to approximately 2100 degrees Farenheit, sufficient to fuse these materials, and heats the immediately adjacent portions of the tooth and tip pellet to their plastic deformation or forging temperatures. The force of forging spring 47 urging tip pellet 42 into tooth 46 now causes the tip pellet to advance into the portion of the tooth which is at fusion temperature and to move solidly against the adjacent portions of the steel which are only at plastic deformation or forging temperature. As the tip is fused into the tooth, the area of contact between the tip and tooth increases, so the heat generated by the contact resistance spreads over a larger portion of the tip, fostering continued displacement of the tip into the tooth. This process continues for a fraction of a second or so until a microswitch 52 on head assembly 18 signals to control system 15 that tip pellet 42 has been forged a desired distance into tooth 46, thereby prompting the control system to terminate the welding operation by discontinuing the welding current. The particular displacement of tip pellet 42 into tooth 46 that causes microswitch 52 to activate is mechanically adjustable, but is typically set to be on the order of ninety percent of the tip pellet's thickness.

Figure 6:
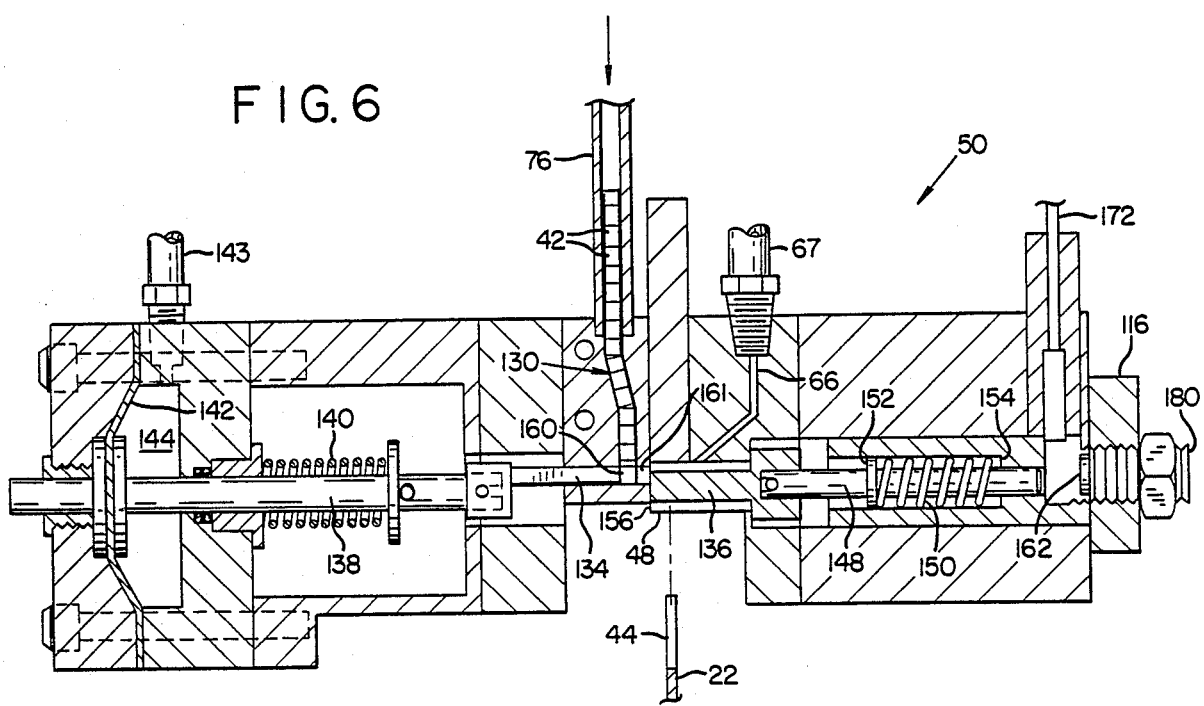
FIG. 6 is a sectional view showing a tipping station component of the head assembly employed in the present invention.
Figure 7:
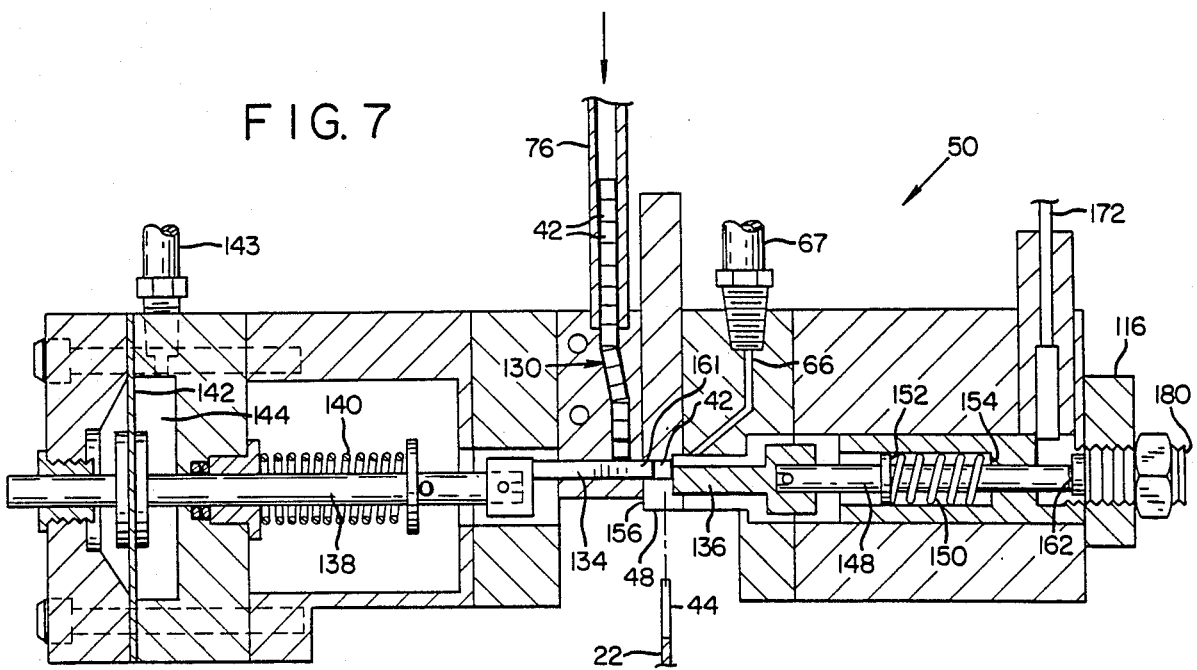
FIG. 7 is a sectional view like FIG. 6 but showing the tipping station during a different phase of its operation.

After the welding current is removed, the welded junction is next cooled by a jet of compressed air directed at the welded junction by a restricting nozzle 66 (FIGS. 6, 7). The compressed air is supplied to nozzle 66 at a pressure of approximately 40 psi from a compressed air source 65 through an air hose 67 switched by a solenoid valve 69. This cooling process continues for a time period set by control system 15, typically on the order of ten seconds. The time period is chosen to reliably cool the saw blade to below 250 degrees Farenheit so as to obtain a full martensitic transformation of the saw body material. The saw body material is typically 1095 carbon steel, so if it is not cooled to below 250 degrees Farenheit before annealing, the resulting weld may prove unsatisfactory.

After the welded junction is cooled, an annealing process begins. In the annealing process, the same electrical power supply 60 as is employed in the welding phase is desirably used, but the output thereof is reduced by switching a tap in its power transformer so that the power applied to the welded junction is reduced. Typically, the annealing is done at a temperature of 600 to 700 degrees Farenheit, which is produced by a heating current of approximately 100 amperes. This annealing heat is applied for a time set by control system 15, typically between five and thirty seconds.

The tapped transformer in electrical power supply 60 provides a simple means for reducing the welding power supply's output power to a second, lower value suitable for annealing. However, the annealing of saw blades of different gauges generally requires different power outputs from power supply 60. Rather than providing a transformer having a multitude of taps for providing the multitude of power levels that may be required (and providing the necessarily complex mechanical tap switching arrangement), the present invention varies the annealing heat by varying the duty cycle of the power supply's operation. This duty cycle is controlled by control system 15 and can be set to any desired value to attain the requisite heating effect. In an exemplary application, the duty cycle is adjusted so that electrical power supply 60 rapidly cycles on and off at a 20 percent duty cycle.

After the above-described welding, cooling and annealing operations have been completed on a given tooth, clamp assembly 16 frees blade 22, indexing assembly 14 indexes the next tooth into position under head assembly 18 and the clamp assembly then reclamps the blade so that the welding, cooling and annealing steps can be initiated on a new tooth.

The tip pellets 42 employed by the present invention desirably comprise square pellets of a cobalt alloy, such as Stellite brand alloy marketed by Deloro Stellite, and have exemplary dimensions of 0.125 by 0.125 by 0.062 inches. These tip pellets are formed of Stellite in a powdered form that has been molded and bonded together in the desired shape by a heating process. They have a Rockwell hardness of approximately C47, whereas the underlying steel blade typically has a hardness of approximately 42 to 47.

A supply of these tip pellets 42 is provided in a container 70 (FIGS. 2, 4, 5) disposed on top of head assembly 18. A delivery system 72, typically comprising a vibrator 74 that vibrates container 70, feeds pellets seriatim into a polyethylene conduit 76. Conduit 76 has a narrow rectangular passage therethrough sized about twenty percent larger than the tip pellets to permit easy travel of the pellets down the conduit. Conduit 76 conveys tip pellets 42 to head assembly 18, where they are positioned on welding electrode 48 for fastening to saw blade 22.

Vibrator 74 that causes tip pellets 42 to singulate from container 70 into conduit 76 would, if operated continuously, eventually cause the pellets to vibrate out of the container. Accordingly, an inductive proximity detector 78 is positioned adjacent conduit 76 to detect the presence of pellets therein. A model E2E-X5Y1-53US inductive proximity detector marketed by Omron Electronics, Inc. is employed in the preferred embodiment. If proximity detector 78 detects pellets in the portion of the conduit adjacent the detector, vibrator 74 is deenergized. When sufficient pellets have been used in the welding process so that detector 78 no longer detects tips in the conduit, vibrator 74 is again operated to fill the conduit up to the inductive proximity detector and then stop operation. Since cyclical operation of vibrator 74 causes several pellets to be singulated into conduit 76, the vibrator need not be operated each time a tooth is tipped.

Reviewing the foregoing discussion, the basic sequence of steps executed by the present invention is to (a) index the saw to bring a tooth to top dead center position under the head assembly, (b) clamp the blade, (c) lower the head assembly to compress the forging spring and urge the tip into the tooth, (d) apply the welding current, (e) shut off the welding current on a signal from the microswitch, (f) turn on the air jet for ten seconds, (g) turn off the air jet and turn on the anneal heat of predetermined energy for a predetermined time period, (h) raise the head assembly and release the clamp, and (i) advance the tooth and repeat the cycle. A model SLC100 programmable controller marketed by Allen Bradley can be used for system control 15 to execute these functions in this sequence.

Head Assembly

Figure 4:
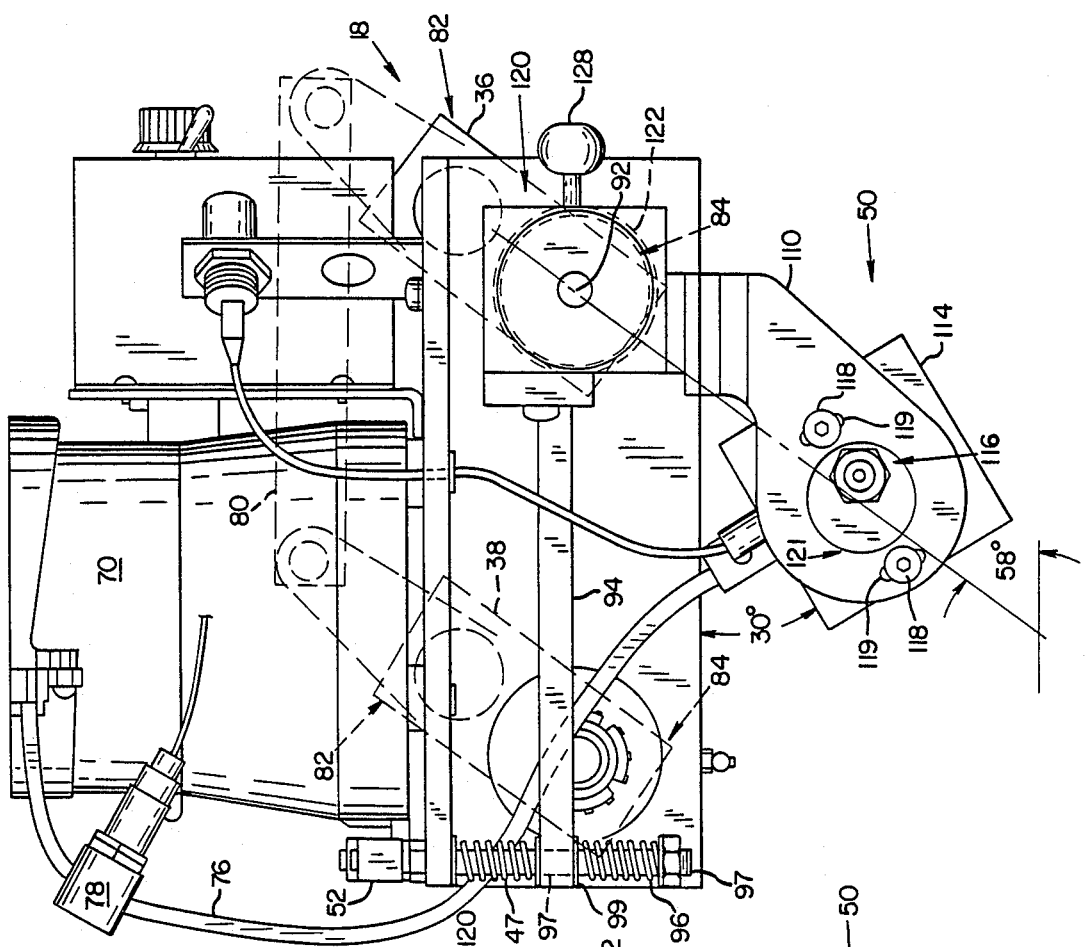
FIG. 4 is a front view showing the head assembly of the present invention in its lowered, operational position.

By comparing FIG. 2 with FIG. 4, it will be recognized that head assembly 18 can be lifted and lowered by swing arms 36, 38 that form a parallel linkage. Swing arm 36 is driven by a rack and pinion assembly operated by a pneumatic cylinder inside case 20, which is in turn controlled by control system 15. A linkage 80 (FIG. 4), also behind case 20, links first swing arm 36 to second swing arm 38. Both swing arms 36, 38 are pivotally coupled at each of their ends, the first ends 82 being pivotally coupled to case 20 and the second ends 84 being pivotally coupled to head assembly 18. This arrangement is used to elevate head assembly 18 when the saw blade is being advanced by indexing system 14. In operation, head assembly 18 is lowered into the operational position illustrated in FIG. 4, pressing the tip pellet carried by tipping station 50 against the face of the tooth that is to be processed.

Figure 5:
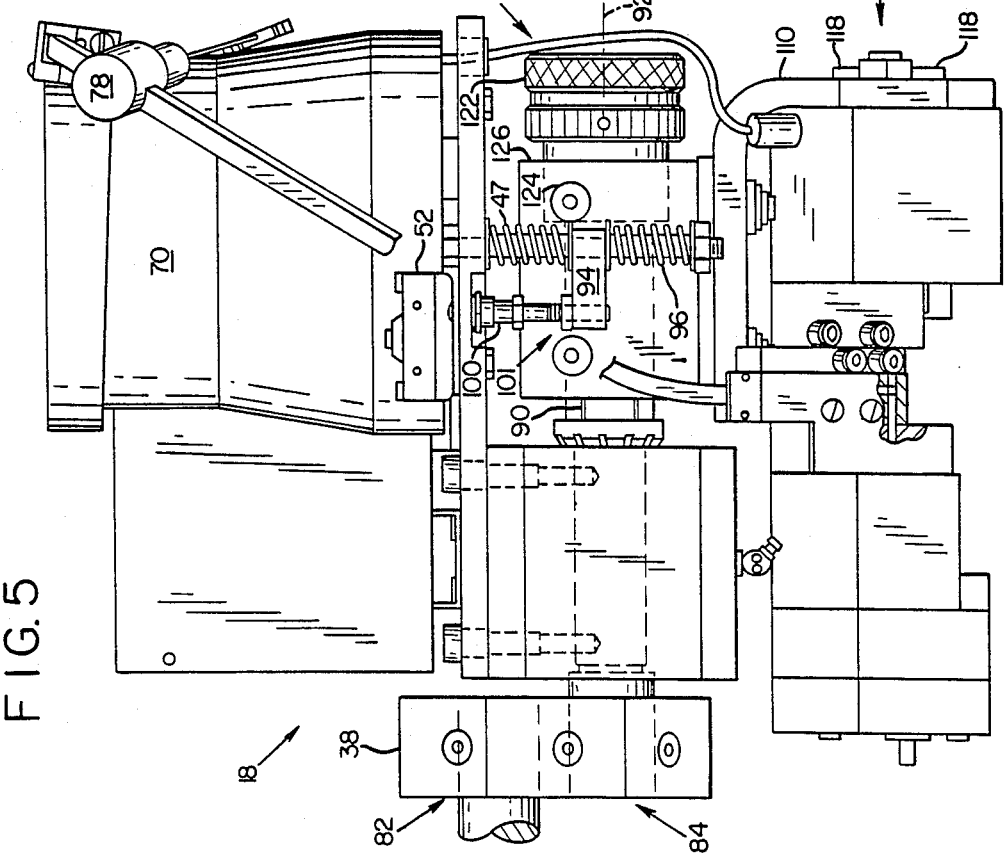
FIG. 5 is a side view of the head assembly shown in FIG. 4.

Referring to FIGS. 4 and 5, tipping station 50 is connected to a support arm 110 that is in turn pivotally coupled to head assembly 18 through a shaft 90 in the head assembly. The line about which tipping station 50 pivots relative to head assembly 18 is thus the axis of this shaft, designated by numeral 92. Rigidly connected to tipping station 50 through support arm 110 and this pivotal connection is a lever arm 94 in head assembly 18. The force of gravity acting on tipping station 50 exerts a counterclockwise torque, as viewed in FIG. 4, about pivot axis 92 which causes lever 94 to be urged downwardly. A second, or counterbalancing spring 96 is provided to counteract this force. Second spring 96 is positioned about a bolt 97 that includes a shoulder on which a washer 99 rests and which, in turn, lever arm 94 normally rests.

When head assembly 18 is lowered onto a saw tooth for applying a tip pellet, the engagement between the tip pellet contained in tipping station 50 and the saw blade causes the tipping station to exert a clockwise torque about pivot axis 92. This clockwise torque causes lever arm 94 to move upwardly, compressing forging spring 47 and simultaneously moving an extendable actuator 100 (FIG. 5) coupled to lever arm 94 up against microswitch 52, closing the switch. This compression of forging spring 47 causes it to exert a downward force on lever arm 94 which tends to urge tipping station 50, and consequently the tip pellet contained therein, downward into the saw blade as the saw steel and the tip pellet are heated. As heating progresses, the fusion of the tip into the saw continues under the influence of forging spring 47. After some displacement, forging spring 47 has pushed lever arm 94 back down to a sufficiently low position (set by extendable actuator 100) that the contact in microswitch 52 that had earlier been closed by action of the extendable actuator again reopens. The opening of this microswitch contact indicates to control system 15 that the desired displacement of the tip pellet into the saw tooth has been achieved. Control system 15 then discontinues the welding current and begins instead application of compressed air to cool the welded junction.

The relatively long length of lever arm 94 relative to the distance between pivot axis 92 and tipping station 50 converts a relatively small movement at tipping station 50 to a relatively large movement at the end of the lever arm. Consequently, the relatively small displacement of tip pellet 42 into saw tooth 46 is converted into a relatively larger displacement at the end of lever arm 94 for operation of microswitch 52. The extendable actuator 100 which operates microswitch 52 is adjustable in height by a threaded bolt arrangement 101 (FIG. 5) to adjust the depth to which pellet tip 42 is to be fused into tooth 46. (It should be mentioned that this welding displacement can similarly be adjusted by dial assembly 28 on indexing assembly 14, which moves the final position of feed finger 24, and thus the precise position at which the saw is clamped, as mentioned earlier.) The desired welding displacement is typically about ninety percent of the thickness of the tip pellet.

As mentioned earlier, tipping station 50 is coupled to head assembly 18 through a support arm 110 that is pivotally connected to the head assembly. At its other end, support arm 110 is rotatably connected to a rectangular block 114 comprising the frame of the tipping station by a boss 116 extending from the end of block 114. The angular relationship between support arm 110 and frame block 114 is adjustable by bolts 118 travelling in slotted paths 119 in the support arm. This adjustment allows the angle of tipping station 50, and consequently the angle at which tip 42 is oriented relative to saw tooth 46, to be varied. A calibration scale 121 facilitates this adjustment. In the illustrated apparatus, this angle is set to 28 degrees from vertical, thereby causing a slight misalignment between tip pellet 42 and saw tooth 46, as illustrated in FIG. 3 and discussed below.

Also shown in FIGS. 4 and 5 is an adjustment that allows the position of tipping station 50 to be varied towards or away from case 20. This distance is desirably made variable because the position of the center line of saw 22 relative to case 20 will vary with the thickness of the saw. Clamp assembly 16 in the preferred embodiment clamps the saw so that its inner face is 6 7/8 inches from case 20. If the saw blade is 0.2 inches thick, the center line is an additional 0.1 inch further out from the case. If the saw is 0.05 inches thick, the center line is an additional 0.025 inches further out from the case. Since clamp 16 is in a fixed position, tipping station 50 must be adjusted by centering adjustment assembly 120 to properly center tip pellets on the center line of the saw.

Centering adjustment assembly 120 includes a knob 122 that connects to a bushing 124 (FIG. 5) threaded into an aluminum block 126 that comprises a portion of head assembly 18. As centering adjustment knob 122 is turned, the threads on bushing 124 are turned in or out of aluminum block 126, thereby causing tipping station 50 to move out or in from case 20. A thumb screw 128 prevents centering knob 122 from being turned after the desired alignment has been achieved.

Turning to FIGS. 6 and 7, there are illustrated the inner workings of tipping station 50 (saw blade 22 is shown spaced from tipping station 50 for clarity of presentation). Tip pellets 42 accumulated in a track 130 fed by conduit 76 are moved laterally into position on welding shoe 48 by operation of two plungers 134 and 136. First plunger 134 is coupled to a first shaft 138 that is biased by a spring 140 and moved by air diaphragm 142. When air is introduced into air chamber 144, diaphragm 142 expands, driving shaft 138 to the left against the force of spring 140, as illustrated in FIG. 6. When air is subsequently vented from chamber 144, diaphragm 142 returns to its original position and spring 140 expands, moving plunger 134 to the right.

Second plunger 136 is coupled to a second shaft 148 that is passively biased by a second biasing spring 150. Second biasing spring 150 is maintained in compression between a stop 152 on shaft 148 and a hard stop 154. Second biasing spring 150 drives second plunger 136 to the left, to the limit of its travel against an edge 156.

In operation, after a welding operation is completed, air diaphragm 142 is operated to retract first plunger 134 to the left. As first plunger 134 reaches the end of its travel, the next tip pellet 42 falls from track 130 down into an intermediate position 160 in a lower track 161. Thereafter, air diaphragm 142 is vented to move first plunger 134 to the right again, pushing ahead of it tip pellet 42. After a short distance, the opposite side of tip pellet 42 is engaged by second plunger 136. The relative forces exerted by first and second biasing springs 140, 150 cause tip pellet 42 pinched between first and second plungers 134, 136 to continue travelling to the right until the shaft 148 to which second plunger 136 is coupled is stopped by a mechanical stop 162. At this position, tip pellet 42 is properly oriented in front of welding shoe 48. Head assembly 18 and associated tipping station 50 are then lowered, as discussed earlier, bringing the leading edge 44 of tooth 46 into engagement with tip pellet 42 resting on welding shoe 48. Welding then proceeds as described earlier.

The dimensions of the tip pellets employed by the present invention depend on the width of the saw blades to which they are to be attached. If the dimensions of the tip pellets employed are to be varied, the travels of first and second plungers 134, 136 gripping the pellets must be adjusted correspondingly to properly center the pellets on the welding shoe and on the saw blade. In the illustrated embodiment, this is accomplished by a threaded shaft 180 which serves to move mechanical stop 162 against which second shaft 148 abuts. By moving mechanical stop 162 to the left, shaft 148 is prevented from travelling as far to the right, so tip pellets of relatively smaller dimensions can be centered on welding shoe 48. Conversely, if mechanical stop 162 is moved to the right, tip pellets of relatively larger dimensions can be accommodated.

Tipping station 50 desirably includes a detector to confirm the presence of a tip pellet on the welding shoe before the application of welding power. In the illustrated embodiment, this detection is effected by an infrared detector 170 (FIGS. 1, 2) which detects whether second shaft 148 is abutted against mechanical stop 162. Such abutment occurs only if a tip pellet is lodged in position on the welding shoe between the first and second plungers. If second shaft 148 is in abutment with mechanical stop 162, infrared light transmitted through a fiber optic cable 172 (FIGS. 2, 6, 7) and directed adjacent mechanical stop 62 will be reflected back into the cable by the presence of second shaft 148 at the mechanical stop. This reflected light is detected by detector 170, confirming that shaft 148 is in abutment with mechanical stop 162, and consequently that tip pellet 2 is in place. Absent such a positive indication from detector 170, control system 15 will prevent the application of welding energy to the welding electrodes.

Geometry

As has been described earlier, the angle at which the tip pellet is oriented relative to the saw blade, and the distance that the tip pellet is forged into the saw blade, are all adjustable in the present invention.

In the prior art, it has been conventional to tip saw blades by urging a tipping material squarely against the face of the saw tooth. In the preferred embodiment of the present invention, by contrast, the tip pellet is not parallel to the leading edge of a saw tooth, but rather is inclined at an angle approximately two to five degrees less than the hook angle of the saw. By cocking the tip pellet slightly in this manner, the initial contact between the tip pellet and the tooth is at substantially a single point at the tip of the tooth. The fusing operation thus starts at the tip and a desirable distribution of electrical power and heat in the tooth is then obtained.

Referring now more particularly to FIG. 3, there is shown a fragment of a circular saw blade to which a tip is being applied according to the present invention. The saw blade illustrated has a hook angle of approximately thirty degrees and presents a slightly convex back face merging with the leading edge at an acute angle of approximately sixty degrees to form the tooth's initial tip. As tip pellet 42 is urged into the tooth, this initial tip is replaced by Stellite.

The angle at which the forging force is applied through the tip pellet to the saw tooth is normal to an imaginary line between the tip pellet and the pivot axis 92 about which tipping station 50 pivots. The apparatus is arranged so that this imaginary line passes through the two points about which swing arm 36 rotates. When swing arm 36 is in its lowered, operational position, this imaginary line has an angle of fifty-eight degrees to the horizontal, as is shown in FIG. 4. Consequently, the forging pressure with which tip pellet 42 is urged into the tooth is oriented downwardly approximately thirty-two degrees below the horizontal, as is shown in FIG. 3. (This angle will vary somewhat during the forging operation since tip pellet 42 travels a curved path.) Since the rake angle of the illustrated blade is thirty degrees, the saw tooth itself defines an angle of about sixty degrees below the horizontal. Thus, the force exerted against tip pellet 42 which is oriented approximately thirty-two degrees below horizontal is directed substantially through the center of the tooth, as is shown by arrow 192 in FIG. 3. The angle with which the tip is driven into the tooth will determine not only the final position of the tip pellet in the tooth, but also the position of the extruded flashing about the sides of the tooth. The thirty-two degree angle illustrated has been found to provide proper tip placement and causes the flashing to extrude at a position where it is readily ground off in a subsequent machining step. In its final position, the corner of tip pellet 42 nested in welding shoe 48 is displaced to substantially the position occupied by the initial tip of the saw tooth. This minimizes the amount of tipping alloy that must be ground off the tooth in a subsequent finishing operation.

Performance

The resultant tipped saw tooth produced by the method and apparatus of the present invention includes a durable junction between the tip pellet and the tooth. This junction encompasses approximately half of the tip pellet metal and a corresponding portion of the tooth base metal, which metals are fused together in the electric welding operation. This large fusion zone eliminates the highly localized thermal sheer stresses found in many conventional tipping techniques.

The present apparatus also improves over the prior art in its reliability of operation. The square tip pellet configuration is readily oriented and manipulated by the automated equipment here employed and does not require the use of a carrier, such as a foil tape or a solid dispensing rod. The square configuration also yields a tipped tooth which is already very close to its final, desired configuration, so only a small amount of grinding is required. The amount of wasted tipping material is thus minimized.

Another advantage of the present invention is that it does not require that the saw be preprocessed, as by grinding or swaging, to form seats into which the Stellite pellets can be welded. Instead, the pellets can be applied directly to the original tips of the saw. The invention is thus equally applicable to saws that have already been tipped once or more, thereby facilitating retipping of previously tipped saws.

The execution of the welding, cooling and annealing steps in sequence on a single tooth at a single station before advancing to other teeth also offers an improvement over prior art techniques wherein the saw must be processed at different stations, or must be rotated repeatedly for all steps to be executed. The invention is more reliable and consistent than these prior art techniques and prevents the fatal flaw of accidentally failing to anneal a tooth, yet does so without extending the saw processing time.

These advantages of the present invention are generally obvious from an inspection of the method and apparatus used. However, the great improvement in the performance of the saw blade and its long life are advantages which only use of the saw can demonstrate.

Alternative Embodiments

Although it is the primary purpose of this invention to provide a method and apparatus of making an improved saw blade, it will be understood by those skilled in the art that the invention can be used to advantage in conjunction with other cutting tools. For example, the cutters customarily used in lathes, shapers, boring mills, et cetera, would be improved if they are tipped with Stellite in accordance with the present invention. Obviously, the tips used to produce the cutting surfaces of these tools would necessarily be different in configuration than those illustrated, but essentially the same procedure as described above for applying the tips could be employed.

Similarly, although the principles of the invention have been described and illustrated with reference to a single preferred embodiment, it will be apparent that the invention can be modified in arrangement and detail without departing from these principles. For example, while the invention has been illustrated with reference to resistance welding, resistance annealing and air cooling, it could similarly be adapted for use with a variety of other welding, annealing and cooling techniques. Likewise, while the invention has been illustrated as having a movable welding station that engages a fixed saw, in alternative embodiments the saw could be movable, either linearly or rotatably, into a stationary welding assembly. Many other variations will be apparent to those skilled in the art. Consequently, I claim as my invention all modifications coming within the scope and spirit of the following claims and equivalents thereof.

I claim:

1. An apparatus for tipping teeth on a saw blade comprising:
   a head assembly;
   mounting means for mounting the saw blade;
   indexing means for moving the saw blade on the mounting means to position successive teeth of the saw blade in a desired position relative to the head assembly;
   clamp means operable alternately with the indexing means for preventing movement of the saw blade;
   the head assembly including welding means for resistance-welding a wear-resistant part to a tooth of the saw blade, cooling means for cooling the welded junction and annealing means for annealing the welded junction; and
   control means operable to activate and deactivate said welding, cooling and annealing means in succession while the clamp means prevents movement of the saw blade.

2. The apparatus of claim 1 in which the welding means comprises electrical means for resistance welding the wear-resistant part to the tooth of the saw blade and in which the annealing means comprises said electrical means in cooperation with means for reducing the electrical power provided to the welded junction by the electrical means.

3. The apparatus of claim 2 in which the means for reducing the electrical power comprises means for varying the duty cycle of the electrical means.

4. The apparatus of claim 1 which further comprises means for providing a single preformed tip portion of the wear-resistant material from a loose supply of several such preformed tip portions to the head assembly and means for positioning the preformed tip portion in a desired orientation with respect to the saw tooth for welding thereto.

5. A method for tipping the teeth of a saw blade with wear-resistant material comprising the steps:
   resistance welding wear-resistant material to a tooth of the saw blade;
   cooling the welded junction;
   annealing the cooled, welded junction; and
   completing said welding, cooling and annealing steps in sequence on a single tooth of the blade before repeating the aforesaid three steps seriatim on other teeth of the blade until all teeth on the saw blade have been tipped.

6. An apparatus for tipping teeth on a saw blade comprising:
   a head assembly;

a source of discrete unattached preformed cobalt alloy tips;

delivery means for conveying said tips seriatim from said source to the head assembly;

the head assembly including means for receiving a tip from said source and means for positioning said tip with a face thereof angled with respect to a leading edge of an unswaged tooth of the saw blade so that the tip and tooth initially engage each other at substantially a single point, said head assembly further including means for urging said oriented tip against the tooth of the saw blade and means for fastening said tip to said tooth.

7. The apparatus of claim 6 which includes:

a source of square cobalt alloy tips;

delivery means for conveying square cobalt alloy tips from said source to the head assembly;

the head assembly including means for receiving a square cobalt alloy tip from said source and positioning said square tip in a desired orientation with respect to a tooth of the saw blade, said head assembly further including means for urging said oriented square tip against the tooth of the saw blade and means for fastening said square tip to said tooth.

8. The apparatus of claim 6 in which said means for fastening comprises resistance-welding means and said means for urging includes an electrode of said resistance welding means.

9. A method for tipping teeth on a saw blade comprising the steps:

providing a saw blade with unswaged teeth;

providing a plurality of loose tip pellets;

automatically conveying said loose pellets to a tip positioning station;

positioning one of said loose pellets in a desired orientation with respect to an unswaged tooth of the saw blade;

welding said pellet to the unswaged tooth of the saw blade; and urging said pellet into said tooth under the influence of a force.

10. The method of claim 9 which additionally comprises the steps:

positioning said pellet with a face thereof angled with respect to the leading edge of the saw tooth so that said pellet and saw tooth initially engage each other at substantially a single point;

heating the engaged portions of said pellet and tooth; and urging said pellet into said tooth.

11. The method of claim 9 which additionally comprises the step of urging said pellet into said tooth along a curved path.

12. The method of claim 9 in which the first step comprises providing a previously tipped saw blade.

13. The method of claim 9 in which said welding step includes welding without use of a brazing material.

14. The method of claim 9 which includes providing a plurality of loose tip pellets formed of stellite having at least 20 percent cobalt.

15. The method of claim 14 which includes providing a plurality of loose ti pellets that have been formed by powdered stellite, molded and bonded together.

16. The method of claim 9 which further includes annealing the weld.

17. An apparatus for tipping teeth on a saw blade comprising:

a head assembly;

clamp means for fixedly positioning the saw blade in a desired position relative to the head assembly;

supply means for supplying a preformed wear-resistant tip to the head assembly;

the head assembly including means for receiving the preformed wear-resistant tip from the supply means and for positioning said tip in a desired orientation with respect to the tooth of the clamped saw blade, said head assembly further including means for urging said oriented tip against the tooth of the saw blade, heating means for applying heat to the junction between the tip and tooth to fuse the tip and tooth together and means responsive to a predetermined displacement of the tip into the tooth for discontinuing application of heat from the heating means to the junction.

18. The apparatus of claim 17 in which the preformed wear-resistant tip is a cobalt alloy tip having a square configuration, the apparatus further including cooling means for cooling the heated junction and annealing means for annealing the heated junction, said heating, cooling and annealing means operating in succession on the tooth while the clamp means prevents movement of the saw blade.

19. The apparatus of claim 17 which further comprises detector means for detecting the presence of a tip in the desired orientation with respect to the tooth of the clamped saw blade and interlock means for preventing the application of heat by the heating means if the detector means does not detect the presence of a tip.

20. In a method for fusing a tip of a wear-resistant material with a tooth of a saw blade by urging the tip into the tooth and heating the junction therebetween, the improvement comprising the steps: detecting the displacement of the tip a predetermined distance into the tooth of the saw blade and discontinuing the heating of the junction in response thereto.

21. In an apparatus for welding and subsequently annealing a wear-resistant tip to a saw tooth, the improvement comprising:

electrical power means for resistance welding said tip and tooth together; and control means for reducing the electrical power provided by the electrical power means to said tip and tooth so that said electrical power means can also anneal the welded junction.

22. The invention of claim 21 in which the control means includes means for reducing the duty cycle during which the heating means operates.

23. A tipping machine for affixing a hard tip to a working portion of a cutting tool comprising:

a work station;

tool feed means for feeding the working the cutting tool to the work station;

tip means for feeding said hard tip to said work station;

positioning means for clamping the hard tip against the working portion at the work station;

resistance welding means for welding the hard tip to the working portion;

annealing means for annealing the welded junction; and control means for:

(a) operating the tool feed means to feed the working portion of the cutting tool to the workstation;

(b) operating the tip feed means to feed a hard tip to the workstation;

(c) operating the positioning means to position the hard tip at the workstation and press against the working portion of the cutting tool;
(d) operating the resistance welding means to weld the hard tip to the working portion of the cutting tool;
(e) discontinuing operation of the welding means upon movement of the tip into the working portion of the cutting tool a predetermined distance;
(f) operating the annealing means; and
(g) operating the feed means to advance the working portion of the cutting tool from the workstation.

* * * * *

REEXAMINATION CERTIFICATE (1823rd)

United States Patent [19]

Pfaltzgraff

[11] B1 4,864,896

[45] Certificate Issued  Oct. 27, 1992

[54] METHOD AND APPARATUS FOR TIPPING TEETH OF SAW BLADES

[75] Inventor: James R. Pfaltzgraff, Beaverton, Oreg.

[73] Assignee: Armstrong Manufacturing Company, Portla, Oreg.

Reexamination Request:
No. 90/002,648, Feb. 14, 1992

Reexamination Certificate for:
Patent No.: 4,864,896
Issued: Sep. 12, 1989
Appl. No.: 67,645
Filed: Jun. 26, 1987

[51] Int. Cl.⁵ .............................................. B23D 65/00
[52] U.S. Cl. ....................................... 76/25.1; 76/112
[58] Field of Search ................... 76/25.1, 101.1, 112, 76/115; 219/77, 152

[56] References Cited

U.S. PATENT DOCUMENTS

| | | |
|---|---|---|
| 1,733,241 | 10/1929 | Scott . |
| 1,901,654 | 3/1933 | Kerr . |
| 2,683,923 | 7/1954 | Replogle . |
| 2,833,638 | 5/1958 | Owen . |
| 2,880,768 | 4/1959 | Kolesh . |
| 3,034,378 | 5/1962 | Anderson . |
| 3,063,310 | 11/1962 | Connoy . |
| 3,104,562 | 9/1963 | Kolesh . |
| 3,241,228 | 3/1966 | Rayniak et al. . |
| 3,295,396 | 1/1967 | Kolb . |
| 3,718,799 | 2/1973 | Sawamura et al. . |
| 3,766,354 | 10/1973 | Bierwith . |
| 3,800,633 | 4/1974 | Funakubo . |
| 3,882,594 | 5/1975 | Jackson et al. . |
| 4,205,564 | 6/1980 | Kolb et al. . |
| 4,214,499 | 7/1980 | Ellis . |
| 4,306,139 | 12/1981 | Shinozaki et al. . |
| 4,366,728 | 1/1983 | Beck et al. . |
| 4,407,172 | 10/1983 | Beck et al. . |
| 4,462,293 | 7/1984 | Gunzner . |
| 4,564,136 | 1/1986 | Kahny et al. . |

FOREIGN PATENT DOCUMENTS

| | | |
|---|---|---|
| 3221897 | 1/1983 | Fed. Rep. of Germany . |
| 2507512 | 12/1982 | France . |
| 60-54831 | of 1985 | Japan . |

OTHER PUBLICATIONS

Scorpion Materials.
Acu-Edge Video.
Armstrong Saw Engineer No. 129, Jan.–Jun. 1986 Hammermill Paper Co., Moundville, Alabama.
Deposition of Fred G. Gunzner Feb. 24, 1992.
Deposition of David T. Spence Jan. 29, 1992.
Deposition of Bernard James Muller Jan. 7, 1992.
Original Vollmer Brochure, "GF 10 U, Machine for the Stellite Tipp of Band Saws, Gang Saws and Circular Saws".
Original Vollmer Brochure, "GAW 11 U, Automatic Machine for the Stellite Tipping of Tooth Tips of Band, Gang and Circular Saw Blades".
Alligator Brochure "Depomatic Plasma PS, Automatic Stellite Tipping Machine".
H S International, "The ISELI Sawblade Tipping System".
Chaston Industrial Saw Ltd. Brochure "ISELI Type SHA Automatic Saw Tipping Machine".

*Primary Examiner*—Roscoe V. Parker, Jr.

[57] ABSTRACT

Wear-resistant tips, preferably comprising preformed pellets of stellite in square configuration, are welded, cooled and subsequently annealed to a saw tooth at a single machine station in rapid succession. A head assembly manipulates the individual pellets and positions them properly on the saw blade for forging thereto. The square configuration of the pellets permits their reliable manipulation and orientation by the automated equipment. The duration of the pellet welding phase is determined by the displacement of the pellet into the saw blade, rather than by reliance on a predetermined time period. After cooling, the annealing is accomplished by using the same electrical power supply as is employed for the welding. The duty cycle of this power supply, however, is regulated to produce the amount of annealing heat required for the particular steel being worked. After the welding, cooling and annealing operations are performed on one tip on one saw tooth, the saw is indexed to bring the next tooth into position for processing.

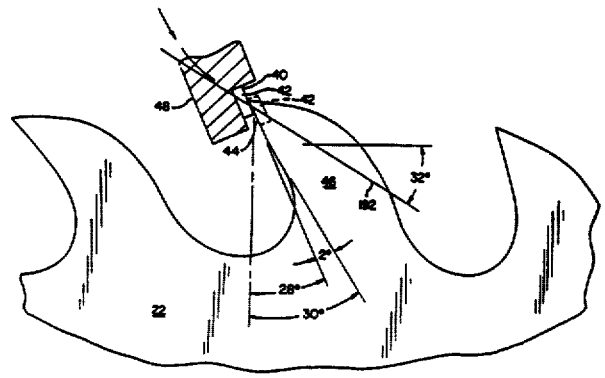

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-23 is confirmed.

* * * * *